US012775496B2

(12) United States Patent
Yun et al.

(10) Patent No.: US 12,775,496 B2
(45) Date of Patent: Oct. 27, 2026

(54) MULTI-LAYER DISTRIBUTED PROCESSING SYSTEM FOR USER SERVICE REQUESTS IN DIGITAL TWIN ENVIRONMENT

(71) Applicant: KOREA ELECTRONICS TECHNOLOGY INSTITUTE, Seongnam-si (KR)

(72) Inventors: Changseok Yun, Gyeonggi-do (KR); Younghan Kim, Seoul (KR); Hyunseuk Ahn, Seongnam-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 398 days.

(21) Appl. No.: 18/532,370

(22) Filed: Dec. 7, 2023

(65) Prior Publication Data

US 2024/0202034 A1 Jun. 20, 2024

Related U.S. Application Data

(63) Continuation of application No. PCT/KR2022/020677, filed on Dec. 19, 2022.

(51) Int. Cl.
*G06F 9/50* (2006.01)

(52) U.S. Cl.
CPC .................................. *G06F 9/5027* (2013.01)

(58) Field of Classification Search
None
See application file for complete search history.

(56) References Cited

U.S. PATENT DOCUMENTS 6,195,682 B1 * 2/2001 Ho ........................ H04L 67/146 709/203
8,495,170 B1 * 7/2013 Vosshall ................ H04L 12/287 709/217
2006/0259487 A1 * 11/2006 Havens ................... G06F 21/51 707/999.009

(Continued)

FOREIGN PATENT DOCUMENTS

CN 102422616 A * 4/2012 ............. H04L 69/09
EP 2883329 B1 * 1/2018 ......... H04L 67/1097

(Continued)

OTHER PUBLICATIONS

International Search Report mailed Sep. 19, 2023 in International Application No. PCT/KR2022/020677, in 4 pages.

*Primary Examiner* — Charles E Anya
(74) *Attorney, Agent, or Firm* — Knobbe, Martens, Olson & Bear, LLP

(57) ABSTRACT

A multi-layer distributed processing system for user service requests in a digital twin environment is proposed. A central server may include a central service manager that receives service requests from users and creates a first process for processing the service requests. A plurality of local servers may include a local service manager that receives the service request from the central service manager and creates a second process for processing the service request. A plurality of edge devices may include an edge service manager that receives the service request from the local server and creates a third process for processing the service request. The central service manager may distribute the service requests from the users to lower layers through propagation between the service managers.

8 Claims, 1 Drawing Sheet

(56) References Cited

U.S. PATENT DOCUMENTS

| | | | | |
|---|---|---|---|---|
| 2007/0150598 | A1* | 6/2007 | Potter | H04L 69/329 709/226 |
| 2007/0226745 | A1* | 9/2007 | Haas | G06F 9/5027 718/105 |
| 2009/0205034 | A1* | 8/2009 | Williams | G06F 21/53 726/9 |
| 2013/0085993 | A1* | 4/2013 | Li | G06F 16/27 707/E17.005 |
| 2015/0046929 | A1* | 2/2015 | Kumar | G06Q 10/10 718/106 |
| 2017/0277616 | A1* | 9/2017 | Topiwala | H04L 67/02 |
| 2019/0369984 | A1 | 12/2019 | Malladi et al. | |
| 2021/0389983 | A1* | 12/2021 | Blue | G06F 9/465 |
| 2022/0191648 | A1* | 6/2022 | Smith | G06F 11/3089 |

FOREIGN PATENT DOCUMENTS

| | | | | |
|---|---|---|---|---|
| KR | 10-2019-0035592 | A | 4/2019 | |
| KR | 10-2064466 | B1 | 1/2020 | |
| KR | 10-2020-0052135 | A | 5/2020 | |
| KR | 10-2411891 | B1 | 6/2022 | |
| KR | 10-2022-0113952 | A | 8/2022 | |
| WO | WO-2019190545 | A1 * | 10/2019 | G06F 9/5055 |

* cited by examiner

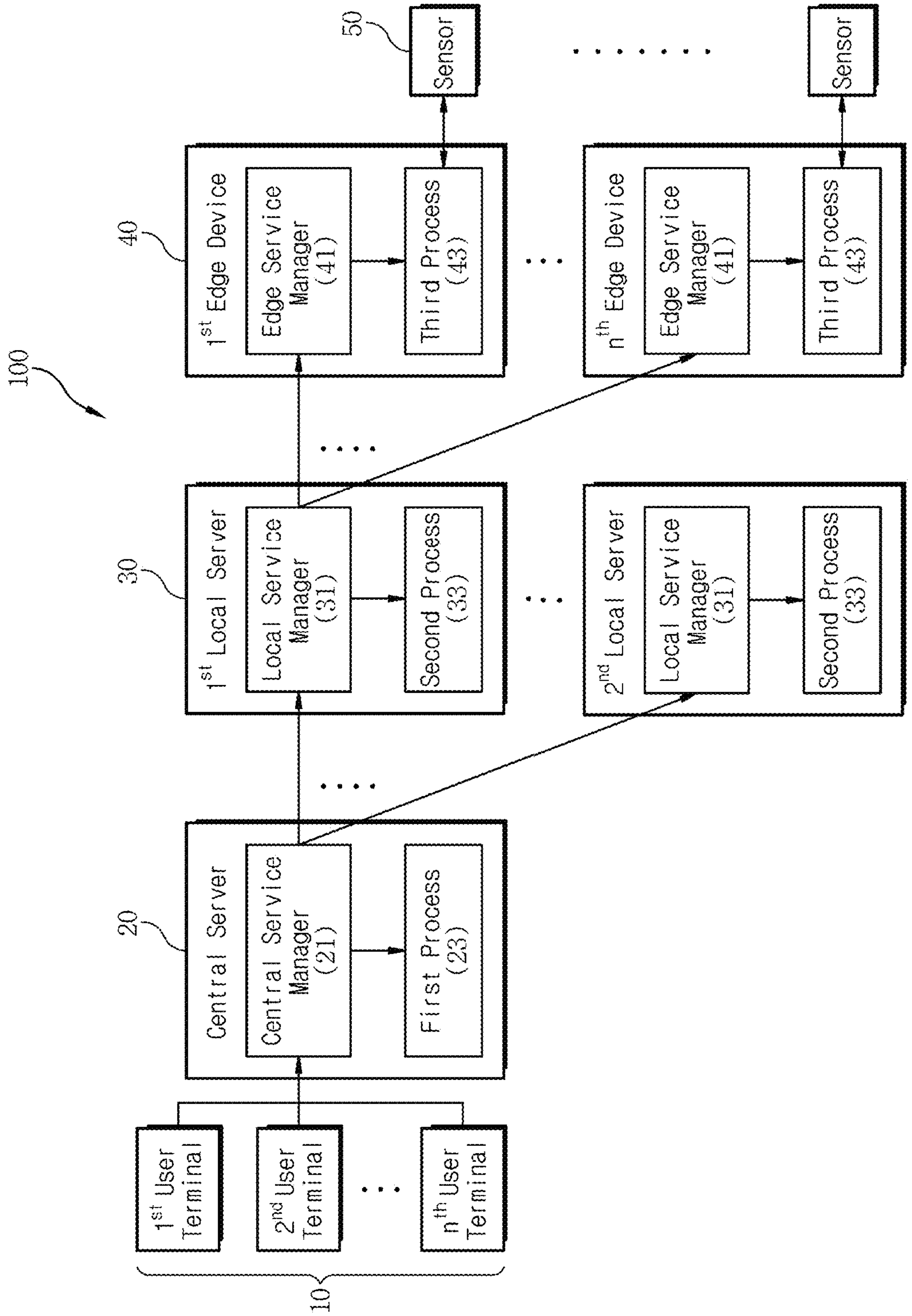
100
50
Sensor
Sensor
40
1st Edge Device
Edge Service Manager (41)
Third Process (43)
nth Edge Device
Edge Service Manager (41)
Third Process (43)
30
1st Local Server
Local Service Manager (31)
Second Process (33)
2nd Local Server
Local Service Manager (31)
Second Process (33)
20
Central Server
Central Service Manager (21)
First Process (23)
1st User Terminal
2nd User Terminal
nth User Terminal
10

MULTI-LAYER DISTRIBUTED PROCESSING SYSTEM FOR USER SERVICE REQUESTS IN DIGITAL TWIN ENVIRONMENT

CROSS REFERENCE TO RELATED APPLICATIONS

This is a continuation application of International Patent Application No. PCT/KR2022/020677 filed on Dec. 19, 2022, the content of which is incorporated herein by reference in its entirety.

BACKGROUND

Technical Field

The present disclosure relates to technology for processing user service requests in a digital twin environment, and more specifically, to a multi-layer distributed processing system for user service requests in a digital twin environment that effectively distributes the user service requests of a single access path to lower devices in a multi-layer structure of a digital twin system and processes them.

Description of Related Technology

In order to effectively calculate and respond to data collected from the real environment in a digital twin environment, calculations on site and calculations on a central server should be performed complexly. In particular, when an urgent response is required, immediate response is performed through on-site recognition, and when large-scale processing is required, most of data processing is performed on the central server after some processing on site.

SUMMARY

One aspect is a multi-layer distributed processing system for user service requests in a digital twin environment that effectively distributes the user service requests of a single access path to lower devices in a multi-layer structure of a digital twin system and processes them.

Another aspect is a multi-layer distributed processing system for user service requests in a digital twin environment. The system includes a central server including a central service manager that receives service requests from users and creates a first process capable of processing the service requests; a plurality of local servers including a local service manager that receives the service request from the central service manager and creates a second process capable of processing the service request; and a plurality of edge devices including an edge service manager that receives the service request from the local server and creates a third process capable of processing the service request, wherein the central service manager distributes the service requests from the users to lower layers through propagation between the service managers.

The service request from the user is received only by the central server and is hierarchically propagated to the local servers and the edge devices through the central server.

The service request includes process information data to be applied to all of the central server, the local servers, and the edge devices.

The process information data includes a program for actual operation, input data link and format, output data link and format, and a time to be delivered after processing.

For the service request, each of the central server, the local servers, and the edge devices creates a process.

When the service request is specified to one device among the central server, the local server, and the edge device, an unspecified device delivers information about the service request to the specified device without creating the process, and the specified device creates a process for the service request.

Upon receiving the service request, the edge device checks whether the service request is processible, and reports whether the service request is processible to an upper device through a path opposite to the path through which the service request is received.

Upon receiving the service request, the central service manager confirms whether the user is qualified to request process creation on the local server or the edge device, and performs propagation within the confirmed qualifications.

Another aspect is a multi-layer distributed processing system for user service requests in a digital twin environment. This system includes a plurality of user terminals that receive service requests from users; a central server including a central service manager that receives the service requests from the plurality of user terminals and creates a first process capable of processing the service requests; a plurality of local servers including a local service manager that receives the service request from the central service manager and creates a second process capable of processing the service request; a plurality of edge devices including an edge service manager that receives the service request from the local server and creates a third process capable of processing the service request; and a sensor connected to the plurality of edge devices and providing sensing data necessary for the service requests, wherein the central service manager distributes the service requests from the users to lower layers through propagation between the service managers.

According to the present disclosure, it is possible to effectively distribute a user service request of a single access path to lower devices in a multi-layer structure of a digital twin system and process them. That is, it is possible to create a process to effectively distribute the user service request to the lower devices in the multi-layered digital twin system and process them simultaneously, and through this, process the service requested by the user.

The distributed processing system according to the present disclosure is efficient in system construction because it receives service requests through a single path rather than allowing users to individually access individual lower devices of the digital twin system to request services.

In addition, the distributed processing system according to the present disclosure can optimize load management for a large number of various requests because the central service manager receives and processes users' service requests.

Further, the distributed processing system according to the present disclosure can effectively share and use data streams of the sensors linked to the actual operating environment for various purposes.

BRIEF DESCRIPTION OF THE DRAWINGS

FIG. 1 is a block diagram showing a multi-layer distributed processing system for user service requests in a digital twin environment according to an embodiment of the present disclosure.

DETAILED DESCRIPTION

In the case of a digital twin integrated system that models the real world and performs integrated data processing and control, signal processing is performed on a central server where the digital twin model is implemented, or signal processing is performed on edge devices themselves and the resulting values are uploaded to the central server. In this case, if the management range is expanded, too many calculations may be performed on the host (central server) side, and conversely, in edge devices, not only limited signal processing is possible, but immediate response is also difficult. For example, assuming that specific objects are recognized through signal processing in a space where several thousand cameras are used, in a centralized signal processing situation, image processing tasks equal to the number of cameras must be performed simultaneously on the central server. Additionally, in order to process all camera images, the original image data must be transmitted to the central server, which creates a large load on the network.

Conversely, when signal processing is performed independently on the edge device, the results may be limited depending on the performance of the edge device. When a user assigns a new task, he or she must perform optimization for each individual edge device and manually set up the connection to the upper server.

Additionally, if users independently request different operations for a single device, unnecessary traffic may be generated and system load may increase. For example, when users A and B want to perform object recognition using the image of the same camera #1, and there is no coordination between the users A and B, the existing method requires transmitting and receiving the image through different channels at the same time, resulting in waste in terms of the overall system.

In the following description, only parts necessary to understand embodiments of the present disclosure will be described, and other parts will not be described to avoid obscuring the subject matter of the present disclosure.

Terms used herein should not be construed as being limited to their usual or dictionary meanings. In view of the fact that the inventor can appropriately define the meanings of terms in order to describe his/her own invention in the best way, the terms should be interpreted as meanings consistent with the technical idea of the present disclosure. In addition, the following description and corresponding drawings merely relate to specific embodiments of the present disclosure and do not represent all the subject matter of the present disclosure. Therefore, it will be understood that there are various equivalents and modifications of the disclosed embodiments at the time of the present application.

Now, embodiments of the present disclosure will be described in detail with reference to the accompanying drawings.

FIG. 1 is a block diagram showing a multi-layer distributed processing system for user service requests in a digital twin environment according to an embodiment of the present disclosure.

Referring to FIG. 1, the multi-layer distributed processing system 100 (hereinafter referred to as ‘distributed processing system’) for user service requests in a digital twin environment according to this embodiment is a system that effectively distributes the user service requests of a single access path to lower devices in a multi-layer structure of a digital twin system and processes them.

The distributed processing system 100 according to this embodiment includes a central server 20, a plurality of local servers 30, and a plurality of edge devices 40. The central server 20 includes a central service manager 21 that receives service requests from users and creates a first process 23 capable of processing the service requests. The plurality of local servers 30 includes a local service manager 31 that receives the service request from the central service manager 21 and creates a second process 33 capable of processing the service request. The plurality of edge devices 40 includes an edge service manager 41 that receives the service request from the local server 30 and creates a third process 43 capable of processing the service request. The central service manager 21 distributes the service requests from the users to lower layers through propagation between the service managers.

As such, the distributed processing system 100 according to this embodiment effectively distributes users’ service requests to computing devices, that is, the central server 20, the local servers 30, and the edge devices 40, of the multi-layered digital twin system, creates processes for processing them simultaneously, and processes the service requests through the created processes.

In addition, the distributed processing system 100 according to this embodiment further includes a plurality of user terminals 10 and sensors 50.

The sensors 50 are connected to the plurality of edge devices 40 and provide sensing data necessary for service requests. The sensor 50 is a device that collects data about the actual environment and may include a camera, an actuator, and the like.

The plurality of user terminals 10, which are communication terminals used by users, receive service requests from users and transmit them to the central server 20. The plurality of user terminals 10 include the first user terminal, the second user terminal, and the nth user terminal (n is a natural number greater than or equal to 2). The user terminal 10 may be a personal computing system such as a smartphone, laptop, desktop, handheld PC, or tablet PC.

In order for a specific signal processing service to be performed using data from a specific sensor 50 located at the end, the user requests a signal processing operation for the specific sensor 50 to the central service manager 21 of the central server 20. This request for the signal processing operation for the specific sensor 50 is a service request.

The service request from the user is received only by the central server 20 and is hierarchically propagated to the local servers 30 and the edge devices 40 through the central server 20. That is, rather than individually accessing the central server 20, the local servers 30, and the edge devices 40 and making the service request, the user makes the service request through a single access path. The central service manager 21 of the central server 20 receives and processes the service requests from users, thereby optimizing load management for various service requests from users.

The service request includes process information data to be applied to all of the central server 20, the local servers 30, and the edge devices 40. The service request is transmitted including the process information data. Here, the process information data includes a program for actual operation, input data link and format, output data link and format, a time to be delivered after processing, and the like.

When the service request is specified to one device among the central server 20, the local server 30, and the edge device 40, an unspecified device delivers information about the service request to the specified device without creating a process. The specified device can create a process for the service request. For example, when a service request is limited to a specific edge device 40, the central server 20 and the local server 30 do not specifically create a process and only transmit information according to the service request to the corresponding edge device 40. The edge service manager 41 of the corresponding edge device 40 creates the third process 43 that operates only within that edge device 40.

As described above, a command given to one host is delivered to the edge device 40 through propagation between the service managers. To achieve this, a multi-layer calculation must be described, and processes must be described based on the functions of each lower level device. Based on the identified description, the user divides and describes the calculation individually and transmits them to the central service manager 21 of the central server 20. Programs described may be delivered as binary or program code. When using the capability of a special computational accelerator, this information may be included in design to improve performance on individual processing devices.

The central server 20 creates the first process 23 to effectively distribute the users' service requests and process them simultaneously through the central service manager 21. The central service manager 21 may forward the received service requests to the local server 30 of the lower layer. The central server 20 may be a server implemented on a network, a cloud server, etc.

Each of the plurality of local servers 30 includes the local service manager 31. The plurality of local servers 30 include the first local server, the second local server, and the nth local server (n is a natural number greater than or equal to 2). The local service manager 31 receives the service request from the central service manager 21 and creates the second process 33 that can process the received service request. The local service manager 31 may forward the received service request to the edge device 40 of the lower layer. The local server 30 may be a server implemented on a network, a cloud server, etc.

Upon receiving the service request, the central service manager 21 may confirm whether the user is qualified to request process creation on the local server 30 or the edge device 40, and perform propagation within the confirmed qualifications. That is, when the user requests a specific service, the central service manager 21 checks through an internally set permission list whether the user is entitled to request process creation on the local server 30 or the edge device 40.

Each of the plurality of edge devices 40 includes the edge service manager 41. The plurality of edge devices 40 include the first edge device, the second edge device, and the nth edge device (n is a natural number greater than or equal to 2). The edge service manager 41 receives the service request from the local service manager 31 and creates the third process 43 that can process the received service request.

Upon receiving the service request, the edge device 40 checks whether the service request is processible. The edge device 40 reports whether the service request is processible to an upper device through a path opposite to the path through which the service request is received. Here, the upper device is the central server 20. That is, users can request a service from the central service manager 21 to perform various functions. However, the edge device 40 may not be able to perform the requested operation due to performance limitations. Therefore, the edge service manager 41 performs an internal test using the given process information to determine whether the requested function can actually be performed. The edge service manager 41 reports to the central server 20 whether or not the received service request is processed based on internal test results. The central service manager 21 reports the process creation results to the user.

As described above, according to this embodiment, it is possible to effectively distribute a user service request of a single access path to lower devices in a multi-layer structure of a digital twin system and process them. That is, it is possible to create a process to effectively distribute the user service request to the lower devices in the multi-layered digital twin system and process them simultaneously, and through this, process the service requested by the user.

The distributed processing system 100 according to this embodiment is efficient in system construction because it receives service requests through a single path rather than allowing users to individually access individual lower devices of the digital twin system to request services.

In addition, the distributed processing system 100 according to this embodiment can optimize load management for a large number of various requests because the central service manager 21 receives and processes users' service requests.

Further, the distributed processing system 100 according to this embodiment can effectively share and use data streams of the sensors 50 linked to the actual operating environment for various purposes.

While the present disclosure has been particularly shown and described with reference to an exemplary embodiment thereof, it will be understood by those skilled in the art that various changes in form and details may be made therein without departing from the scope of the present disclosure as defined by the appended claims.

What is claimed is:

1. A multi-layer distributed processing system for user service requests in a digital twin environment, comprising:
   - a central server including a central service manager, the central service manager configured to receive service requests from users and create a first process for processing the service requests;
   - a plurality of local servers including a local service manager, the local service manager configured to receive the service request requests from the central service manager and create a second process for processing the service requests; and
   - a plurality of edge devices including an edge service manager, the edge service manager configured to receive the service requests from the local server and create a third process for processing the service requests,
   - wherein the central service manager is configured to distribute the service requests from the users to lower layers through propagation between the service managers, and
   - wherein in response to receiving the service requests, the central service manager is configured to confirm whether the users are qualified to request process creation on the local server or the edge device, and perform propagation within the confirmed qualifications.

2. The system of claim 1, wherein the service requests from the users are configured to be received only by the central server and are configured to be hierarchically propagated to the local servers and the edge devices through the central server.

3. The system of claim 2, wherein the service requests include process information data to be applied to all of the central server, the local servers, and the edge devices.

4. The system of claim 3, wherein the process information data includes a program for actual operation, input data link and format, output data link and format, and a time to be delivered after processing.

5. The system of claim 1, wherein for the service requests, each of the central server, the local servers, and the edge devices is configured to create a process.

6. The system of claim 1, wherein in response to receiving the service requests, the edge device is configured to check whether the service requests are processible, and report whether the service requests are processible to an upper device through a path opposite to the path through which the service requests are received.

7. A multi-layer distributed processing system for user service requests in a digital twin environment, comprising: a central server including a central service manager, the central service manager configured to receive service requests from users and create a first process for processing the service requests;

a plurality of local servers including a local service manager, the local service manager configured to receive the service requests from the central service manager and create a second process for processing the service requests; and a plurality of edge devices including an edge service manager, the edge service manager configured to receive the service requests from the local server and create a third process for processing the service requests, wherein the central service manager is configured to distribute the service requests from the users to lower layers through propagation between the service managers, and wherein for the service requests, each of the central server, the local servers, and the edge devices is configured to create a process, wherein in response to the service requests being specified to one device among the central server, the local server, and the edge device, an unspecified device is configured to deliver information about the service requests to the specified device without creating the process, and wherein the specified device is configured to create a process for the service requests.

8. A multi-layer distributed processing system for user service requests in a digital twin environment, comprising:

a plurality of user terminals configured to receive service requests from users;

a central server including a central service manager, the central service manager configured to receive the service requests from the plurality of user terminals and create a first process for processing the service requests;

a plurality of local servers including a local service manager, the local service manager configured to receive the service requests from the central service manager and create a second process for processing the service requests;

a plurality of edge devices including an edge service manager, the edge service manager configured to receive the service requests from the local server and create a third process for processing the service requests; and a sensor connected to the plurality of edge devices and configured to provide sensing data for the service requests, wherein the central service manager is configured to distribute the service requests from the users to lower layers through propagation between the service managers, and wherein in response to receiving the service requests, the central service manager is configured to confirm whether the users are qualified to request process creation on the local server or the edge device, and perform propagation within the confirmed qualifications.

* * * * *